(12) United States Patent
Okita

(10) Patent No.: US 9,221,341 B2
(45) Date of Patent: Dec. 29, 2015

(54) VEHICLE OPERATION INPUT APPARATUS AND CONTROL METHOD FOR VEHICLE OPERATION INPUT APPARATUS

(75) Inventor: Munechika Okita, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 287 days.

(21) Appl. No.: 13/608,264

(22) Filed: Sep. 10, 2012

(65) Prior Publication Data

US 2013/0076499 A1  Mar. 28, 2013

(30) Foreign Application Priority Data

Sep. 26, 2011 (JP) ................................. 2011-208806

(51) Int. Cl.
| | | |
|---|---|---|
| *B60Q 1/00* | (2006.01) | |
| *B60K 37/06* | (2006.01) | |
| *B60K 35/00* | (2006.01) | |
| *G06F 3/0488* | (2013.01) | |

(52) U.S. Cl.
CPC ............... *B60K 37/06* (2013.01); *B60K 35/00* (2013.01); *G06F 3/04886* (2013.01); *B60K 2350/1012* (2013.01); *B60K 2350/1016* (2013.01); *B60K 2350/928* (2013.01)

(58) Field of Classification Search
CPC ............ B60K 37/06; B60K 2350/928; B60K 2350/1052; B60R 11/0264; B60R 2011/001
USPC ............ 345/8, 633, 156, 173, 158, 589, 175, 345/184, 1.1, 419, 617, 7; 701/31.4, 1, 36, 701/31.9, 29.1, 42, 45, 491, 51, 514, 517, 701/532, 533, 70; 340/438, 447, 13.24, 340/426.13, 450, 457.1, 475, 572.1, 575, 340/665

See application file for complete search history.

(56) References Cited

U.S. PATENT DOCUMENTS

| | | | |
|---|---|---|---|
| 7,304,653 B2 * | 12/2007 | Ueno | 345/649 |
| 2003/0096593 A1 | 5/2003 | Naboulsi | |
| 2004/0209594 A1 * | 10/2004 | Naboulsi | 455/404.1 |
| 2007/0262970 A1 * | 11/2007 | Matsumoto et al. | 345/173 |
| 2009/0315869 A1 | 12/2009 | Sugihara et al. | |
| 2012/0300061 A1 * | 11/2012 | Osman et al. | 348/135 |

FOREIGN PATENT DOCUMENTS

| | | |
|---|---|---|
| CN | 101609660 A | 12/2009 |
| DE | 102009046451 A1 | 5/2011 |
| JP | 07-306055 A | 11/1995 |
| JP | 2002-358162 A | 12/2002 |
| JP | 2004249834 A | 9/2004 |
| JP | 2006151363 A | 6/2006 |
| JP | 2006-298241 A | 11/2006 |
| JP | 2007249567 A | 9/2007 |
| JP | 2007304953 A | 11/2007 |

* cited by examiner

*Primary Examiner* — Brian Zimmerman
*Assistant Examiner* — Thomas McCormack
(74) *Attorney, Agent, or Firm* — Sughrue Mion, PLLC

(57) ABSTRACT

A vehicle operation input apparatus includes: a display having a screen; and a control unit configured to determine whether or not a hand of a driver has been removed from a steering wheel, and after determining that the hand of the driver has been removed from the steering wheel in a situation where an operation menu is not displayed on the screen, control the display such that the operation menu is displayed on the screen.

7 Claims, 6 Drawing Sheets

VEHICLE OPERATION INPUT APPARATUS AND CONTROL METHOD FOR VEHICLE OPERATION INPUT APPARATUS

INCORPORATION BY REFERENCE

The disclosure of Japanese Patent Application No. 2011-208806 filed on Sep. 26, 2011, including the specification, drawings and abstract, is incorporated herein by reference in its entirety.

BACKGROUND OF THE INVENTION

1. Field of the Invention

The invention relates to a vehicle operation input apparatus that displays an operation menu on a screen of a display, and a control method thereof.

2. Description of Related Art

A conventional image display apparatus displays an operation menu in response to the approach of a finger toward a touch panel disposed on a screen of a display in order to receive a user operation (see Japanese Patent Application Publication No. 2002-358162 (JP 2002-358162 A), for example).

In the image display apparatus described in JP 2002-358162 A, however, the operation menu is not displayed until the finger approaches the touch panel, and it may therefore be impossible to operate operation buttons on the operation menu smoothly. Further, when the image display apparatus is applied to a vehicle, a driver performs an operating procedure of first displaying the operation menu by bringing a finger close to the touch panel and then operating a desired operation button while looking at the operation menu. In this operating procedure, substantially two operations (an operation to bring the finger close and an operation of the desired operation button) are required to operate a single operation button, and therefore operability may deteriorate.

SUMMARY OF THE INVENTION

The invention provides a vehicle operation input apparatus with which an operation menu can be displayed on a screen of a display with favorable operability, and a control method thereof.

A first aspect of the invention relates to a vehicle operation input apparatus. The vehicle operation input apparatus includes: a display having a screen; and a control unit configured to determine whether or not a hand of a driver has been removed from a steering wheel, and after determining that the hand of the driver has been removed from the steering wheel in a situation where an operation menu is not displayed on the screen, control the display such that the operation menu is displayed on the screen.

A second aspect of the invention relates to a control method for a vehicle operation input apparatus. The control method includes: determining whether or not a hand of a driver has been removed from a steering wheel; and after determining that the hand of the driver has been removed from the steering wheel in a situation where an operation menu is not displayed on a screen of a display, controlling the display such that the operation menu is displayed on the screen.

According to the configurations described above, a vehicle operation input apparatus with which an operation menu can be displayed on a screen of a display with favorable operability is obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described below with reference to the drawings.

Figure 1:
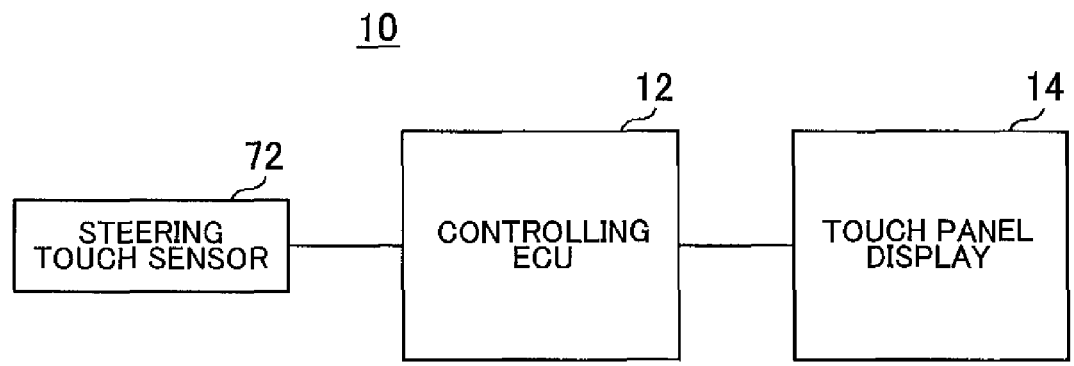
FIG. 1 is a system diagram showing main configurations of a vehicle operation input apparatus 10 according to a first embodiment.
Figure 2:
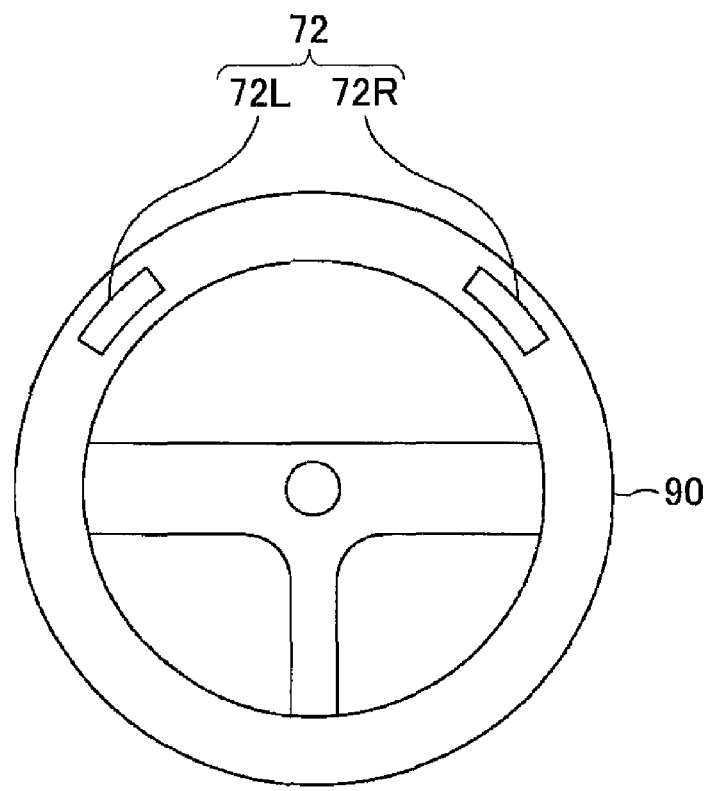
FIG. 2 is a schematic view showing a steering wheel 90 installed with an example of a steering touch sensor 72.

FIG. 1 is a system diagram showing main configurations of a vehicle operation input apparatus 10 according to a first embodiment of the invention. FIG. 2 is a schematic view showing a steering wheel 90 installed with a steering touch sensor 72.

The vehicle operation input apparatus 10 includes an ECU 12 as a main component. The controlling ECU 12 is configured as a microcomputer constituted by a central processing unit (CPU), a read-only memory (ROM), a random access memory (RAM), and so on that are connected to each other via a bus, not shown in the drawing. Programs executed by the CPU and data are stored in the ROM.

A touch panel display 14 is connected to the controlling ECU 12. The touch panel display 14 is disposed in an appropriate location of a vehicle cabin where it can be viewed easily by a driver. For example, the touch panel display 14 may be disposed on an instrument panel. The touch panel display 14 functions to detect touch operations performed by a user (by a hand of the user, for example) such as the driver, and display various information. Note that a touch operation detection method may be a pressure sensitive method or an electrostatic method, as desired.

A touch sensor (to be referred to hereafter as a steering touch sensor) 72 provided on a steering wheel 90 (see FIG. 2) is connected to the controlling ECU 12. As shown in FIG. 2, for example, the steering touch sensor 72 may be provided in parts of the steering wheel 90 that are gripped respectively by left and right hands of the driver. In the example shown in FIG. 2, the steering touch sensor 72 includes a steering touch sensor 72L for detecting contact between the left hand of the driver and the steering wheel 90 and a steering touch sensor 72R for detecting contact between the right hand of the driver and the steering wheel 90.

The controlling ECU 12 may be connected to the touch panel display 14 and the steering touch sensor 72 either by wire via an appropriate bus or wirelessly, or by a combination thereof. Further, all or a part of the functions of the controlling ECU 12 may be incorporated into another element. For example, all or a part of the functions of the controlling ECU 12 may be realized by a control device provided in the touch panel display 14. Furthermore, the controlling ECU 12 may be realized by a single ECU or through cooperation between a plurality of ECUs (control devices).

Figure 3A:
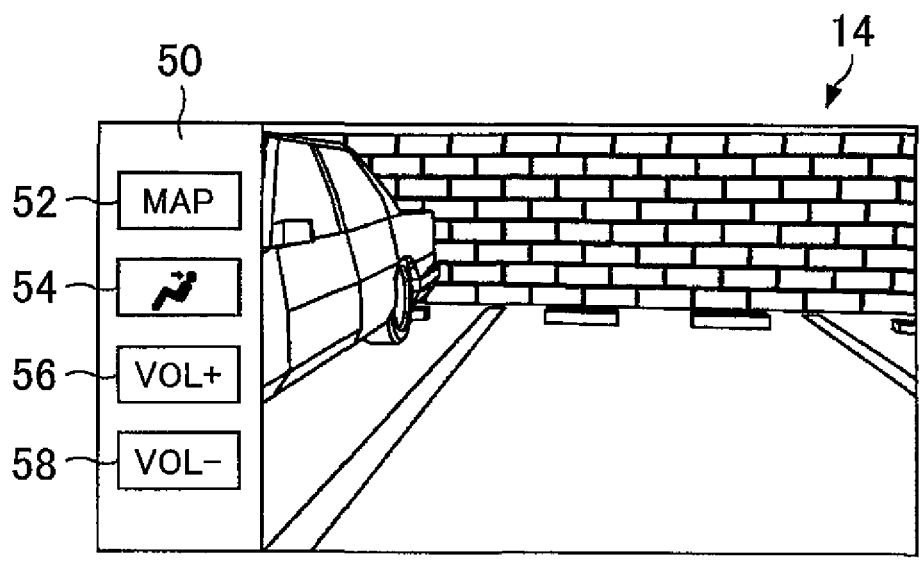
FIGS. 3A and 3B are views showing examples of display conditions on a screen of a touch panel display 14.
Figure 3B:
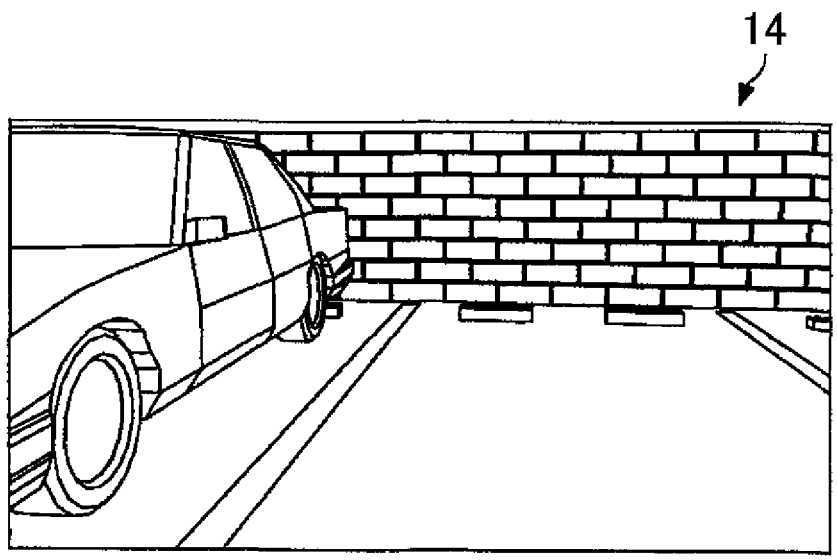

FIGS. 3A and 3B are views showing examples of display conditions on a screen of the touch panel display 14. FIG. 3A shows a condition in which an operation menu is displayed on the screen of the touch panel display 14, and FIG. 3B shows a condition in which the operation menu is not displayed on the screen of the touch panel display 14.

The controlling ECU 12 controls the display condition on the screen of the touch panel display 14. More specifically, the controlling ECU 12 switches the display condition of an operation menu 50 on the screen of the touch panel display 14 between a condition in which the operation menu 50 is displayed (see FIG. 3A) and a condition in which the operation menu 50 is not displayed (see FIG. 3B).

Any desired information may be displayed on the screen of the touch panel display 14. For example, a map of a navigation device, TV, video captured by a vehicle periphery monitoring camera, and so on may be displayed on the screen of the touch panel display 14. In the examples shown in FIG. 3, an image from a rear camera is displayed on the screen of the touch panel display 14.

The operation menu 50 is displayed on the screen of the touch panel display 14 in a superimposed mode. In other words, the operation menu 50 is displayed by being superimposed onto the rear camera image. The operation menu 50 includes at least one operation button, and typically includes two or more operation buttons (touch switches) 52, 54, 56, 58, as shown in FIG. 3. The operation menu 50 may be constituted by the operation buttons 52, 54, 56, 58 alone, or may include portions for displaying other information (for example, sites for displaying TV, audio, an outside air temperature, travel information such as fuel efficiency, entertainment information, and so on).

The types (functions) of the operation buttons 52, 54, 56, 58 may be set as desired. For example, the operation buttons may include an operation button for displaying (calling up) a menu or a map (a map including a current position, for example) on which to perform various settings relating to the navigation device on the screen of the touch panel display 14. The operation buttons may also include an operation button for displaying a menu on which to perform various settings relating to an air-conditioning device on the screen of the touch panel display 14. Further, the operation buttons may include an operation button for displaying a menu on which to perform various settings relating to audio or TV (volume adjustment and the like) on the screen of the touch panel display 14. Moreover, the operation buttons may be operation buttons (icons or launchers) for activating desired applications.

In the example shown in the drawings, the operation button 52 is a button for calling up the map of the navigation device onto the screen of the touch panel display 14. The operation button 54 is a button for setting a mode of the air-conditioning device. The operation buttons 56 and 58 are buttons for adjusting an output volume.

The operation menu 50 may be disposed in any desired position on the screen. The operation menu 50 is typically disposed on an end (a left end in the example shown in the drawing) of the screen of the touch panel display 14. For example, the operation menu 50 may be disposed in a single location on the left end, a right end, or a lower edge of the screen of the touch panel display 14, or may be divided between a plurality of locations.

Hence, in this embodiment, by switching between the condition (a full screen condition) in which the operation menu 50 is not displayed on the screen of the touch panel display 14 and the condition (an operation menu display screen condition) in which the operation menu 50 is displayed in a part of the screen of the touch panel display 14, operations can be performed on the touch panel display 14 while maximizing an amount of information provided to the user through the screen of the touch panel display 14.

Next, a method of controlling a switch between the full screen condition and the operation menu display screen condition will be described.

Figure 4:
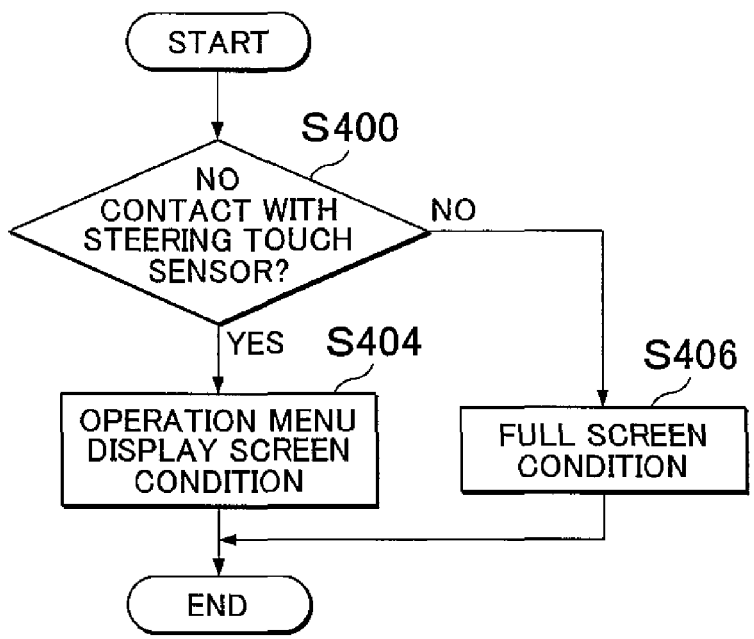
FIG. 4 is a flowchart showing an example of a switch control method for switching between a full screen condition and an operation menu display screen condition, which is executed by a controlling electronic control unit (ECU) 12 according to the first embodiment.

FIG. 4 is a flowchart showing an example of a switch control method for switching between the full screen condition and the operation menu display screen condition, which is executed by the controlling ECU 12 according to the first embodiment. A processing routine shown in FIG. 4 may be executed repeatedly at predetermined period intervals while an ignition switch or an ACC of the vehicle is ON, for example.

In Step 400, a determination is made as to whether or not a signal from the steering touch sensor 72 indicates no contact between a hand and the steering wheel 90. In other words, a determination is made as to whether or not a hand of the driver has been removed from the steering wheel 90 on the basis of the signal from the steering touch sensor 72. At this time, it may be determined that the hand of the driver has been removed from the steering wheel 90 when the hand that is closer to the touch panel display 14, of the left and right hands, is removed from the steering wheel 90. For example, in a configuration where the touch panel display 14 is disposed in the center of the instrument panel in a right-hand drive vehicle, it may be determined that the hand of the driver has been removed from the steering wheel 90 when removal of the left hand of the driver from the steering wheel 90 is detected on the basis of a signal from the steering touch sensor 72L. In a configuration where the touch panel display 14 is disposed in the center of the instrument panel in a left-hand drive vehicle, meanwhile, it may be determined that the hand of the driver has been removed from the steering wheel 90 when removal of the right hand of the driver from the steering wheel 90 is detected on the basis of a signal from the steering touch sensor 72R. In both cases, from the viewpoint of suppressing effects of chattering, noise, and so on, it may be determined that the hand of the driver has been removed from the steering wheel 90 when the signal from the steering touch sensor 72 indicates an OFF condition (no hand contact) continuously for a predetermined time.

When it is determined in Step 400 that the hand of the driver has been removed from the steering wheel 90, the routine advances to Step 404, and in all other cases (i.e. when it is determined that the hand of the driver has not been removed from the steering wheel 90), the routine advances to Step 406.

In Step 404, the touch panel display 14 is controlled to the operation menu display screen condition (see FIG. 3A) in which the operation menu 50 is displayed.

In Step 406, the touch panel display 14 is controlled to the full screen condition in which the operation menu 50 is not displayed.

Hence, according to the processing shown in FIG. 4, when the hand of the driver is removed from the steering wheel 90 in a situation where the display condition on the screen of the touch panel display 14 corresponds to the full screen condition, the display condition on the screen of the touch panel display 14 is switched to the operation menu display screen condition in which the operation menu 50 is displayed. When the hand of the driver has not been removed from the steering wheel 90, meanwhile, the full screen condition, in which the operation menu 50 is not displayed, is maintained. Therefore, when the driver wishes to perform an operation on the touch panel display 14, the operation menu 50 can be displayed by removing his/her hand (the hand on the touch panel display 14 side) from the steering wheel 90. As a result, the operation menu 50 can be displayed at an earlier timing in comparison with a configuration in which the operation menu is not displayed until the hand approaches the touch panel display 14, for example. Further, by bringing the hand removed from the steering wheel 90 close to the operation menu 50, the desired operation button 52, 54, 56, or 58 can be operated through a series of operations, and therefore an improvement in operability is achieved. In other words, since a special operation (a pre-operation) for displaying the operation menu 50 is not required, the desired operation button 52, 54, 56, or 58 on the operation menu 50 can be operated smoothly. In particular, the operation menu 50 is displayed at the timing where the hand is removed from the steering wheel 90, and therefore the driver can move his/her hand toward the desired operation button 52, 54, 56, or 58 directly from the steering wheel 90. On the other hand, in a configuration in which the operation menu is not displayed until the hand approaches the touch panel display 14, for example, the hand that is brought close to the touch panel display 14 must be moved again toward the desired operation button.

Further, in a case where the driver merely wishes to look at the touch panel display 14 without operating the touch panel display 14, the driver is not likely to remove his/her hand from the steering wheel 90. In this case, according to the processing shown in FIG. 4, the touch panel display 14 is maintained in the full screen condition, and therefore the driver can be provided with a maximum amount of information. In other words, it is determined that the driver does not intends to operate the operation buttons 52 to 58 via the operation menu 50 as long as the hand of the driver is not removed from the steering wheel 90, and therefore the driver can be provided with the maximum amount of information in the full screen condition.

In the processing shown in FIG. 4, to suppress chattering between appearance and disappearance of the operation menu 50 (i.e. chattering during a switch between the operation menu display screen condition and the full screen condition), a condition according to which the operation menu display screen condition is switched to the full screen condition may include a condition that the operation buttons 52 to 58 of the operation menu 50 have not been operated continuously for a predetermined time, for example.

Figure 5:
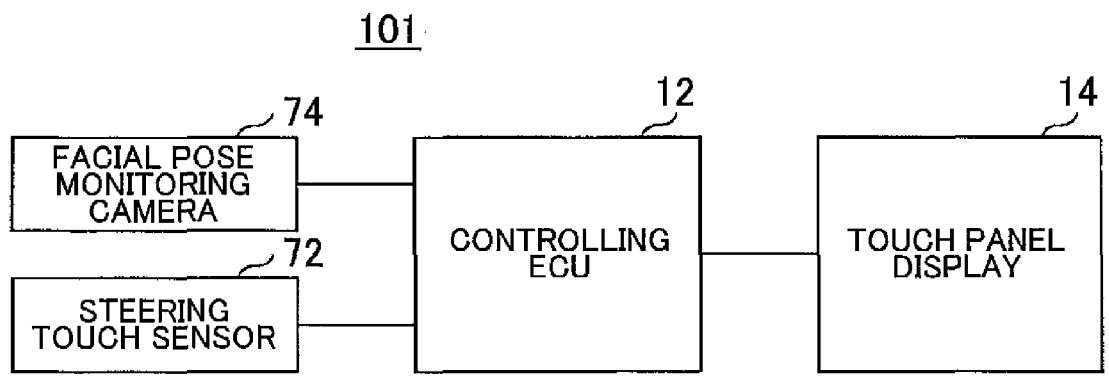
FIG. 5 is a system diagram showing main configurations of a vehicle operation input apparatus 101 according to a second embodiment.

FIG. 5 is a system diagram showing main configurations of a vehicle operation input apparatus 101 according to a second embodiment of the invention.

The second embodiment mainly differs from the first embodiment described above in that a facial pose monitoring camera 74 is connected to the controlling ECU 12.

The facial pose monitoring camera 74 includes a color- or infrared-sensitive charge-coupled device (CCD) sensor array, for example. The facial pose monitoring camera 74 is provided in an appropriate location of the vehicle to be capable of capturing a front surface (a face portion from the front, for example) of the driver, for example. The facial pose monitoring camera 74 is disposed, for example, in an appropriate location such as a back mirror of the vehicle, a dashboard of the instrument panel, or a steering column. The facial pose monitoring camera 74 may be configured to obtain an image of the driver in real time and supply the obtained image to the controlling ECU 12 in a streaming format at predetermined frame period intervals. Further, the facial pose monitoring camera 74 may double as a camera used for another application such as detecting snoozing.

The controlling ECU 12 may be connected to the facial pose monitoring camera 74 either by wire via an appropriate bus or wirelessly, or by a combination thereof. Further, all or a part of the functions of the controlling ECU 12 may be incorporated into another element, including the facial pose monitoring camera 74.

Figure 6:
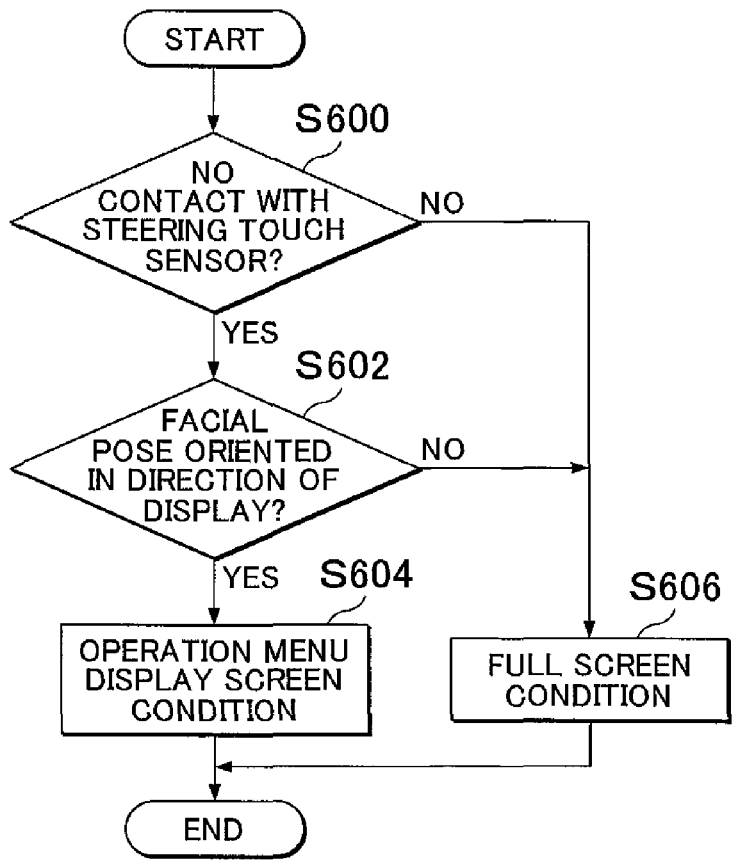
FIG. 6 is a flowchart showing an example of the switch control method for switching between the full screen condition and the operation menu display screen condition, which is executed by the controlling ECU 12 according to the second embodiment.

FIG. 6 is a flowchart showing an example of the switch control method for switching between the full screen condition and the operation menu display screen condition, which is executed by the controlling ECU 12 according to the second embodiment.

Processing of Steps 600, 604, and 606 is substantially identical to the processing of Steps 400, 404, and 406, respectively, shown in FIG. 4, and therefore description of this processing has been omitted. When an affirmative determination is made in Step 600, the routine advances to Step 602.

Figure 7:
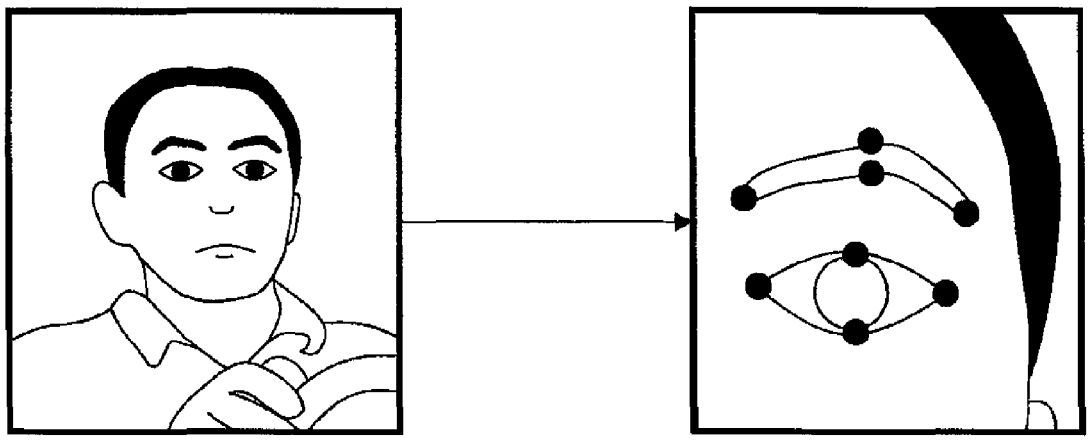
FIG. 7 is an illustrative view illustrating a method of recognizing an image of a viewing direction, and an extracted image in which eyebrow and eye parts are extracted as face parts.

In Step 602, a facial pose of the driver is obtained through image recognition on the basis of an image captured by the facial pose monitoring camera 74, and a determination is made as to whether or not the facial pose of the driver is oriented in a direction of the touch panel display 14. In other words, the facial pose of the driver is recognized by performing image processing on the image obtained by the facial pose monitoring camera 74, and a determination is made as to whether or not the facial pose of the driver is oriented in the direction of the touch panel display 14. For example, first, representative points (feature points) of the face are extracted from the image obtained by the facial pose monitoring camera 74. A technique based on any appropriate method, for example an Active Appearance Model (AAM), may be used as a feature extraction method. Next, an appropriate edge detection algorithm (a Sobel edge detection algorithm, for example) is applied to extract edges indicating the face and the facial features. Next, using the edges and feature points extracted as described above, parts of the face are separated and shapes of the parts of the face are extracted, as shown in FIG. 7. FIG. 7 shows an image of only a representative part of the face, on which eyebrow and eye parts have been extracted as the parts of the face. Next, a current facial pose is detected by determining a degree to which positions and orientations of the extracted parts of the face match positions and orientations of the same parts on respective facial poses stored in advance. The facial pose may be expressed by a rotary angle in a horizontal plane, using a frontward direction of the face when the driver is in a regular posture as a reference, for example. Further, the condition for determining whether or not the facial pose of the driver is oriented in the direction of the touch panel display 14 may be adapted to the driver. For example, a range of facial poses of the driver while actually operating the touch panel display 14 may be learned such that when the detected facial pose of the driver is within this range, it is determined that the facial pose of the driver is oriented in the direction of the touch panel display 14. Various methods may be employed to detect the facial pose through image recognition processing, and the invention is not limited to the method described above. For example, a contour line of an eyeball may be extracted as the part of the face, whereby the orientation of a sightline of the driver may be detected on the basis of a position of the eyeball within the contour of the eye. The orientation of the sightline of the driver and the facial pose of the driver are both effective parameters for estimating an intention of the driver, and may therefore be used singly or in combination. A method of switching the display condition on the screen of the touch panel display 14 using the facial pose of the driver will be described below, but the orientation of the sightline of the driver may be used instead of or in addition to the facial pose.

When it is determined in Step 602 that the image-recognized facial pose of the driver is oriented in the direction of the touch panel display 14, the routine advances to Step 604, and when it is determined that the facial pose is not oriented in the direction of the touch panel display 14 (for example, when the facial pose is oriented frontward), the routine advances to Step 606.

Hence, according to the processing shown in FIG. 6, when the hand of the driver is removed from the steering wheel 90 and the facial pose of the driver is oriented in the direction of the touch panel display 14 in a situation where the display condition on the screen of the touch panel display 14 corresponds to the full screen condition, the display condition on the screen of the touch panel display 14 is switched to the operation menu display screen condition in which the operation menu 50 is displayed. When either of these two conditions is not satisfied, on the other hand, the full screen condition, in which the operation menu 50 is not displayed, is maintained. Therefore, when the driver wishes to perform an operation on the touch panel display 14, the operation menu 50 ban be displayed by removing the hand on the touch panel display 14 side from the steering wheel 90 while looking at the touch panel display 14. As a result, the operation menu 50 can be displayed at an earlier timing. Further, by bringing the hand removed from the steering wheel 90 close to the operation menu 50, the desired operation button 52, 54, 56, or 58 can be operated through a series of operations, and therefore an improvement in operability is achieved. Moreover, the desired operation button 52, 54, 56, or 58 on the operation menu 50 can be operated smoothly by a direct hand movement from the steering wheel 90 toward the desired operation button 52, 54, 56, or 58. Furthermore, it is determined that the driver does not intend to operate the operation button 52, 54, 56, or 58 via the operation menu 50 as long as the hand of the driver is not removed from the steering wheel 90, and therefore the driver can be provided with the maximum amount of information in the full screen condition.

In the example shown in FIG. 6, in a case where route guidance to a destination is underway by a navigation ECU 78 such that a map is displayed on the screen of the touch panel display 14 and a route guidance message has been output or a host vehicle position is located close to a left/right turning point of the guidance route, the full screen condition in which the operation menu 50 is not displayed may be maintained even when it is determined that the hand of the driver is removed from the steering wheel 90 and the facial pose of the driver is oriented in the direction of the touch panel display 14. The reason for this is that in such situations, the driver is likely to turn toward the touch panel display 14 in order to look at the map but not likely to operate the touch panel display 14.

Figure 8:
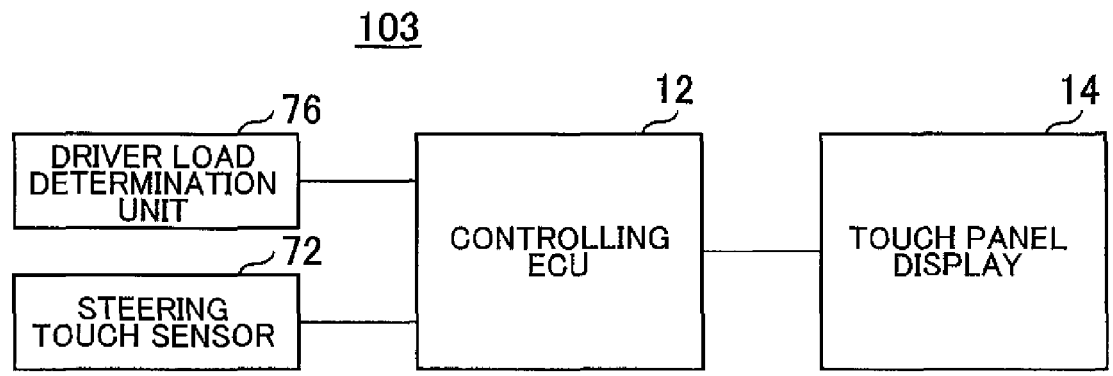
FIG. 8 is a system diagram showing main configurations of a vehicle operation input apparatus 102 according to a third embodiment.

FIG. 8 is a system diagram showing main configurations of a vehicle operation input apparatus 102 according to a third embodiment of the invention.

The third embodiment mainly differs from the first embodiment described above in that a driver load determination unit 76 is connected to the controlling ECU 12.

The driver load determination unit 76 determines a condition of a driving load on the driver. The driver load determination unit 76 may estimate (determine) the condition of the driving load on the driver on the basis of information from various in-vehicle sensors and various ECUs. For example, the driver load determination unit 76 determines the condition of the driving load on the driver on the basis of a steering angle sensor and/or a vehicle speed sensor. In this case, the driver load determination unit 76 may determine that the driving load on the driver is small when variation in the steering angle is at or below a predetermined threshold and/or when the vehicle speed is at or below a predetermined threshold.

The controlling ECU 12 may be connected to the driver load determination unit 76 either by wire via an appropriate bus or wirelessly, or by a combination thereof. Further, all or a part of the functions of the driver load determination unit 76 may be incorporated into the controlling ECU 12.

Figure 9:
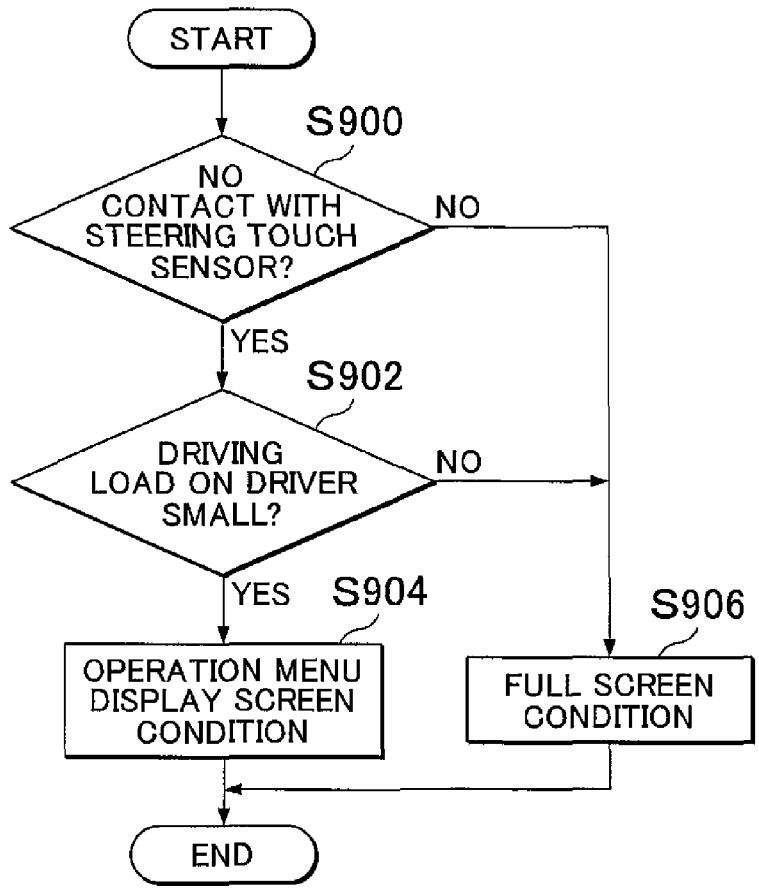
FIG. 9 is a flowchart showing an example of the switch control method for switching between the full screen condition and the operation menu display screen condition, which is executed by the controlling ECU 12 according to the third embodiment.

FIG. 9 is a flowchart showing an example of the switch control method for switching between the full screen condition and the operation menu display screen condition, which is executed by the controlling ECU 12 according to the third embodiment.

Processing of Steps 900, 904, and 906 is substantially identical to the processing of Steps 400, 404, and 406, respectively, shown in FIG. 4, and therefore description of this processing has been omitted. When an affirmative determination is made in Step 900, the routine advances to Step 902.

In Step 902, a determination is made on the basis of a determination result from the driver load determination unit 76 as to whether or not the driving load on the driver is at or below a predetermined level. The predetermined level corresponds to a driving load above which it is difficult for the driver to operate the touch panel display 14. For example, the driving load on the driver may be determined to be at or below the predetermined level when the vehicle speed is at or below a predetermined threshold (including a case in which the vehicle speed is zero) or when the steering angle or a steering speed is at or below a predetermined threshold (including a case in which the steering angle is zero, or in other words during direct advancement). The predetermined level (a predetermined threshold or the like relative to the vehicle speed, as described above, for example) may be adapted to the driver. For example, a vehicle speed range, a steering angle range, or the like while actually operating the touch panel display 14 may be learned such that when the detected vehicle speed, steering angle, or the like is within this range, the driving load on the driver is determined to be at or below the predetermined level.

When it is determined in Step 902 that the driving load on the driver is at or below the predetermined level, the routine advances to Step 904, and when the driving load on the driver is not at or below the predetermined level, the routine advances to Step 906.

Hence, according to the processing shown in FIG. 9, when the hand of the driver is removed from the steering wheel 90 and the driving load on the driver is at or below the predetermined level in a situation where the display condition on the screen of the touch panel display 14 corresponds to the full screen condition, the display condition on the screen of the touch panel display 14 is switched to the operation menu display screen condition in which the operation menu 50 is displayed. When either of these two conditions is not satisfied, on the other hand, the full screen condition, in which the operation menu 50 is not displayed, is maintained. Therefore, when the driver wishes to perform an operation on the touch panel display 14, the operation menu 50 can be displayed by removing the hand on the touch panel display 14 side from the steering wheel 90 while under a small driving load. Hence, by bringing the hand removed from the steering wheel 90 close to the operation menu 50, the desired operation button 52, 54, 56, or 58 can be operated through a series of operations, and therefore an improvement in operability is achieved. Moreover, the desired operation button 52, 54, 56, or 58 on the operation menu 50 can be operated smoothly by a direct hand movement from the steering wheel 90 toward the desired operation button 52, 54, 56, or 58. Furthermore, it is determined that the driver does not intend to operate the operation button 52, 54, 56, or 58 via the operation menu 50 as long as the hand of the driver is not removed from the steering wheel 90, and therefore the driver can be provided with the maximum amount of information in the full screen condition. Moreover, since the driving load on the driver is taken into consideration, situations in which the display condition on the screen of the touch panel display 14 is switched to the operation menu display screen condition when the driver removes his/her hand from the steering wheel 90 unintentionally (for example, when switching the hand holding the steering wheel 90 while turning the steering wheel 90 by a large amount during a right or left turn or the like), i.e. without intending to operate the touch panel 14, can be suppressed. In particular, when the driving load on the driver is large, the driver is less likely to operate the touch panel display 14, and therefore the switch between the full screen condition and the operation menu display screen condition can be realized in a manner that matches the intentions of the driver with a high degree of precision.

In certain cases when the driver wishes to perform an operation on the touch panel display 14 during vehicle travel, the driver may start to operate the touch panel display 14 after waiting for the driving load on him/her to decrease, for example while waiting for traffic lights to change or during low speed travel. According to the processing shown in FIG. 6, the display condition on the screen of the touch panel display 14 is switched to the operation menu display screen condition when the hand of the driver is removed from the steering wheel 90 after shifting to a low driving load condition, and therefore the switch to the operation menu display screen condition can be realized in a manner that matches the intentions of the driver with a high degree of precision.

The third embodiment may be combined with the second embodiment described above (i.e. the configuration taking into account the facial pose of the driver). More specifically, when the hand of the driver is removed from the steering wheel 90, the driving load on the driver is small, and the facial pose of the driver is oriented in the direction of the touch panel display 14 in a situation where the display condition on the screen of the touch panel display 14 corresponds to the full screen condition, the display condition on the screen of the touch panel display 14 may be switched to the operation menu display screen condition in which the operation menu 50 is displayed. When any of these three conditions is not satisfied, on the other hand, the full screen condition in which the operation menu 50 is not displayed may be maintained.

Figure 10:
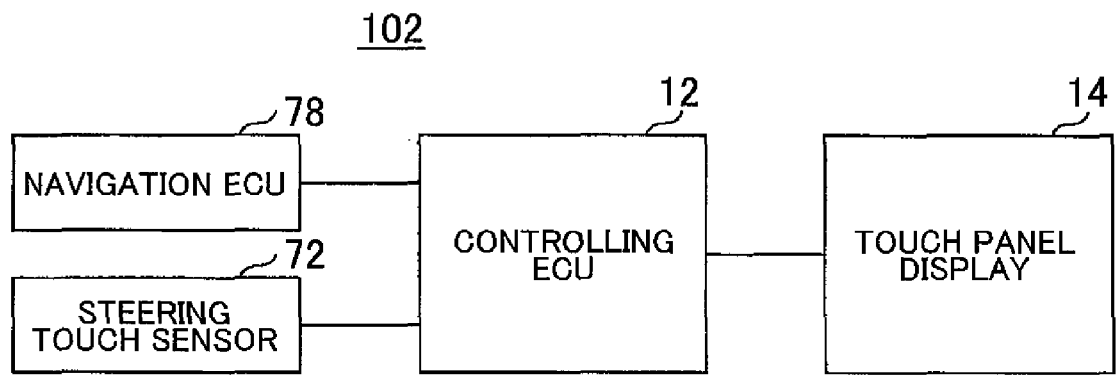
FIG. 10 is a system diagram showing main configurations of a vehicle operation input apparatus 103 according to a fourth embodiment.

FIG. 10 is a system diagram showing main configurations of a vehicle operation input apparatus 103 according to a fourth embodiment of the invention.

The fourth embodiment mainly differs from the first embodiment described above in that the navigation ECU 78 is connected to the controlling ECU 12.

The controlling ECU 12 makes determinations in relation to information (information such as the presence or absence of a straight road, a curve, a bend, an intersection, and so on) relating to a road ahead of the host vehicle in an advancement direction or a road on which the host vehicle is currently traveling on the basis of map information obtained from the navigation ECU 78 and host vehicle position information obtained from a global positioning system (GPS) receiver (not shown).

The controlling ECU 12 may be connected to the navigation ECU 78 either by wire via an appropriate bus or wirelessly, or by a combination thereof. Further, all or a part of the functions of the navigation ECU 78 may be incorporated into the controlling ECU 12, and conversely, all or a part of the functions of the controlling ECU 12 may be incorporated into the navigation ECU 78.

Figure 11:
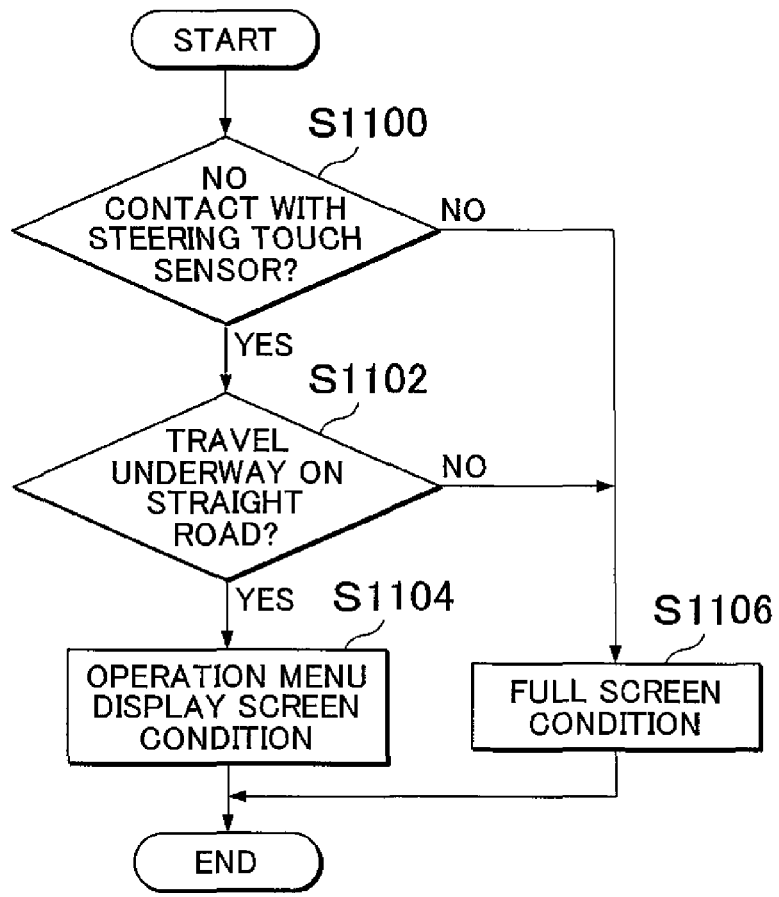
FIG. 11 is a flowchart showing an example of the switch control method for switching between the full screen condition and the operation menu display screen condition, which is executed by the controlling ECU 12 according to the fourth embodiment.

FIG. 11 is a flowchart showing an example of the switch control method for switching between the full screen condition and the operation menu display screen condition, which is executed by the controlling ECU 12 according to the fourth embodiment.

Processing of Steps 1100, 1104, and 1106 is substantially identical to the processing of Steps 400, 404, and 406, respectively, shown in FIG. 4, and therefore description of this processing has been omitted. When an affirmative determination is made in Step 1100, the routine advances to Step 1102.

In Step 1102, a determination is made on the basis of the map information obtained from the navigation ECU 78 and the host vehicle position information obtained from the GPS receiver as to whether or not the host vehicle is traveling on a straight road. Note that a straight road need not refer strictly to a "straight line", and may by a road having a radius of curvature of at least a predetermined value. The predetermined value may correspond to a limit value of a radius of curvature at which a hold on the steering wheel 90 does not have to be changed. When the host vehicle is traveling on a straight road, the routine advances to Step 1104, and when the host vehicle is not traveling on a straight road (during travel on a curve, a bend, an intersection, and so on, for example), the routine advances to Step 1106.

Hence, according to the processing shown in FIG. 11, when the hand of the driver is removed from the steering wheel 90 and the host vehicle is traveling on a straight road in a situation where the display condition on the screen of the touch panel display 14 corresponds to the full screen condition, the display condition on the screen of the touch panel display 14 is switched to the operation menu display screen condition in which the operation menu 50 is displayed. When either of these two conditions is not satisfied, on the other hand, the full screen condition, in which the operation menu 50 is not displayed, is maintained. Therefore, when the driver wishes to perform an operation on the touch panel display 14, the operation menu 50 can be displayed by removing the hand on the touch panel display 14 side from the steering wheel 90 while traveling on a straight road. Hence, by bringing the hand removed from the steering wheel 90 close to the operation menu 50, the desired operation button 52, 54, 56, or 58 can be operated through a series of operations, and therefore an improvement in operability is achieved. Moreover, the desired operation button 52, 54, 56, or 58 on the operation menu 50 can be operated smoothly by a direct hand movement from the steering wheel 90 toward the desired operation button 52, 54, 56, or 58. Furthermore, it is determined that the driver does not intend to operate the operation button 52, 54, 56, or 58 via the operation menu 50 as long as the hand of the driver is not removed from the steering wheel 90, and therefore the driver can be provided with the maximum amount of information in the full screen condition. Moreover, situations in which the display condition on the screen of the touch panel display is switched to the operation menu display screen condition when the driver removes his/her hand from the steering wheel 90 unintentionally while changing his/her hold on the steering wheel 90 in order to operate the steering wheel 90 by a large amount during travel on a curve, a bend, or an intersection, a right or left turn, and so on, for example, can be suppressed. Further, a situation in which the steering wheel 90 needs to be operated by a large amount corresponds to a situation in which the driving load on the driver is large, and therefore the driver is unlikely to operate the touch panel display 14 in such a situation. Hence, the switch between the full screen condition and the operation menu display screen condition can be realized in a manner that matches the intentions of the driver with a high degree of precision.

In Step 1102 in FIG. 11, a determination as to whether or not the host vehicle is traveling on a curved road or a bend may be made instead of determining whether or not the host vehicle is traveling on a straight road. In this case, a determination may be made as to whether or not the host vehicle is traveling on a curved road or a bend requiring the driver to change his/her hold on the steering wheel 90. The determination as to whether or not the driver needs to change his/her hold on the steering wheel 90 may be made taking into consideration the radius of curvature and length of the curve, an angle of the bend, and so on. When the host vehicle is traveling on a curved road or a bend, the routine may advance to Step 1106, and in all other cases, the routine may advance to Step 1104.

The fourth embodiment may be considered as an aspect of the third embodiment described above. In other words, a case in which the host vehicle is traveling on a straight road may be considered as a case in which the driving load on the driver is at or below the predetermined level. Further, the fourth embodiment may be considered in combination with the other conditions of the third embodiment. For example, if the vehicle speed is high during travel on a straight road, the full screen condition may be maintained even when the driver removes his/her hand from the steering wheel 90. Conversely, if the vehicle speed is extremely low (during a traffic jam, for example) while traveling on a curved road, the display condition on the screen of the touch panel display 14 may be switched to the operation menu display screen condition when the driver removes his/her hand from the steering wheel 90.

The fourth embodiment may by combined with the second embodiment described above (i.e. the configuration taking into account the facial pose of the driver). More specifically, when the hand of the driver is removed from the steering wheel 90, the host vehicle is traveling on a straight road, and the facial pose of the driver is oriented in the direction of the touch panel display 14 in a situation where the display condition on the screen of the touch panel display 14 corresponds to the full screen condition, the display condition on the screen of the touch panel display 14 may be switched to the operation menu display screen condition in which the operation menu 50 is displayed. When any of these three conditions is not satisfied, on the other hand, the full screen condition in which the operation menu 50 is not displayed may be maintained.

Furthermore, in the example shown in FIG. 11, the determination as to whether or not the host vehicle is traveling on a straight road is made on the basis of the map information obtained from the navigation ECU 78 and the host vehicle position information obtained from the GPS receiver, but instead of or in addition to this configuration, a similar determination may be made on the basis of an output value of a yaw rate sensor, an output value (a lateral acceleration) of an acceleration sensor and an output value of a vehicle speed sensor, a white line image recognition result (and a road curvature determination result based thereon) obtained from images captured by a periphery monitoring camera, and so on. Further, in the example shown in FIG. 11, the condition of the road on which the host vehicle is currently traveling is determined, but instead of or in addition to this configuration, the display condition on the screen of the touch panel display 14 may be switched similarly by determining the condition of the road ahead of the host vehicle in the advancement direction. The reason for this is that the driver is unlikely to operate the touch panel display 14 when approaching a curve, a bend, or a point such as an intersection at which a left or right turn is performed.

Furthermore, in the example shown in FIG. 11, when route guidance to a destination is underway by the navigation ECU 78, an intersection over which the host vehicle is to travel straight may be regarded as a straight road.

Embodiments of the invention were described above, but the invention is not limited to these embodiments, and various amendments and replacements may be added to the embodiments without departing from the scope of the invention.

For example, in the above embodiments, removal of the hand of the driver from the steering wheel 90 is detected using the steering touch sensor 72, but removal of the hand of the driver from the steering wheel 90 may be detected using another sensor instead of or in addition to the steering touch sensor 72. For example, removal of the hand of the driver from the steering wheel 90 may be detected by image processing using an in-vehicle camera (the facial pose monitoring camera 74 or another camera).

Further, in the above embodiments, the steering touch sensor 72 may detect contact between the hand of the driver and the steering wheel 90 using any desired principle, such as an electrostatic method or a pressure-sensitive method. Note that the steering touch sensor 72 differs from a touch switch (an operation switch) provided on the steering wheel 90. Furthermore, in the example shown in FIG. 2, the two steering touch sensors 72L, 72R are provided on the left and right sides to detect contact between the steering wheel 90 and the left and right hands of the driver, respectively, but a single touch sensor (a configuration in which contact by the left and right hands is determined in accordance with a contact position coordinate) may be employed. Moreover, a configuration in which only contact by the hand on the touch panel display 14 side is detected may be employed. For example, in a configuration where the touch panel display 14 is disposed in the center of the instrument panel in a right-hand drive vehicle, the steering touch sensor 72L may be provided alone, and in a configuration where the touch panel display 14 is disposed in the center of the instrument panel in a left-hand drive vehicle, the steering touch sensor 72R may be provided alone.

Further, in the example shown in FIG. 2, contact between the steering wheel 90 and both the left and right hands of the driver may be detected. Accordingly, in Step 400 of FIG. 4, Step 600 of FIG. 6, and so on, for example, it may be determined that the hand of the driver has been removed from the steering wheel 90 when both the left and right hands are removed (when the vehicle is stationary or the like, for example). Alternatively, when both the left and right hands are removed during vehicle travel, the routine may advance to Step 406 of FIG. 4, Step 606 of FIG. 6, and so on exceptionally, where the full screen condition is maintained.

Furthermore, in the embodiments described above, the touch panel display 14 may be controlled to the operation menu display screen condition when the approach of a hand toward the touch panel display 14 or contact between the hand and the touch panel display 14 is detected using an approach sensor, a touch sensor, or the like. In other words, the approach of the hand toward the touch panel display 14 or contact between the hand and the touch panel display 14 may be detected in addition to detecting the removal of the hand of the driver from the steering wheel 90 in consideration of the possibility of an operation performed from a front passenger seat side or a malfunction in the steering touch sensor 72, the detection precision of the facial pose (in the case of the second embodiment), and so on. In this case, for example, the touch panel display 14 may be controlled to the operation menu display screen condition when the approach of the hand toward the touch panel display 14 or contact between the hand and the touch panel display 14 is detected, even if removal of the hand of the driver from the steering wheel 90 has not been detected.

Moreover, the touch panel display 14 having both a display function and an operation function is used in the above embodiments, but a remote operation type display, in which the display function and the operation function are separated from each other, may be used instead. More specifically, a presentation display and an operation touch panel that are synchronized with each other may be disposed in different positions of the vehicle cabin such that the operation touch panel is disposed closer to the driver than the presentation display. An operation menu displayed on the presentation display shows information relation to operation buttons operated on the operation touch panel. In this case, the driver can operate the nearby operation touch panel white looking at the presentation display. In this case, the presentation display may be provided with an operation function and the operation touch panel may be provided with a display function. Likewise in this case, the presentation display may be controlled to the operation menu display screen condition when removal of the hand of the driver from the steering wheel 90 is detected.

What is claimed is:

1. A vehicle operation input apparatus comprising:
a display having a screen;
a sensor configured to detect a hand position; and
a control unit configured to determine whether or not a hand of a driver has been removed from a steering wheel, and after determining that the hand of the driver has been removed from the steering wheel in a situation where an operation menu is not displayed on the screen, control the display such that the operation menu is displayed on the screen,
wherein the display is a touch panel display configured to detect touch, and
wherein the control unit is configured to determine whether or not a host vehicle is traveling on a straight road or whether or not a road ahead of the host vehicle in an advancement direction is a straight road, and after determining that the hand of the driver has been removed from the steering wheel and the host vehicle is traveling on a straight road in a situation where the operation menu is not displayed on the screen or determining that the hand of the driver has been removed from the steering wheel and the road ahead of the host vehicle in the advancement direction is a straight road in a situation where the operation menu is not displayed on the screen, control the display such that the operation menu is displayed on the screen.

2. The vehicle operation input apparatus according to claim 1, wherein, even if the hand of the driver is determined to have been removed from the steering wheel in a situation where the operation menu is not displayed on the screen, the control unit is configured to control the display such that display of the operation menu is suppressed after determining that the host vehicle is traveling on a curved road or a bend, or the road ahead of the host vehicle in the advancement direction is a curved road or a bend.

3. The vehicle operation input apparatus according to claim 1, wherein the control unit is configured to obtain map information and host vehicle position information, and determine whether or not the host vehicle is traveling on a straight road or whether or not the road ahead of the host vehicle in the advancement direction is a straight road on the basis of the obtained map information and host vehicle position information.

4. A vehicle operation input apparatus comprising:
a display having a screen;
a sensor configured to detect a hand position; and
a control unit configured to determine whether or not a hand of a driver has been removed from a steering wheel, and after determining that the hand of the driver has been removed from the steering wheel in a situation where an operation menu is not displayed on the screen, control the display such that the operation menu is displayed on the screen,
wherein the display is a touch panel display configured to detect touch, and
wherein the control unit is configured to determine whether or not a driving load on the driver is at or below a predetermined level, and after determining that the hand of the driver has been removed from the steering wheel and the driving load on the driver is at or below the predetermined level in a situation where the operation menu is not displayed on the screen, control the display such that the operation menu is displayed on the screen, wherein the control unit is configured to determine the driving load on the driver on the basis of vehicle speed information and steering angle information.

5. The vehicle operation input apparatus according to claim 4, wherein, even if the hand of the driver is determined to have been removed from the steering wheel in a situation where the operation menu is not displayed on the screen, the control unit is configured to control the display such that display of the operation menu is suppressed after determining that the driving load on the driver is larger than the predetermined level.

6. A control method for a vehicle operation input apparatus, comprising:
determining whether or not a hand of a driver has been removed from a steering wheel by detection of a hand position by a sensor; and
after determining that the hand of the driver has been removed from the steering wheel in a situation where an operation menu is not displayed on a screen of a display, controlling the display such that the operation menu is displayed on the screen,
determining whether or not a driving load determined on the basis of vehicle speed information and steering angle information on the driver is at or below a predetermined level, and after determining that the hand of the driver has been removed from the steering wheel and the driving load on the driver is at or below the predetermined level in a situation where the operation menu is not displayed on the screen, controlling the display such that the operation menu is displayed on the screen, wherein the display is a touch panel display configured to detect touch.

7. The method according to claim 6, wherein even if the hand of the driver is determined to have been removed from the steering wheel in a situation where the operation menu is not displayed on the screen, controlling the display such that display of the operation menu is suppressed after determining that the driving load on the driver is larger than the predetermined level.

\* \* \* \* \*